United States Patent
Aoki et al.

(10) Patent No.: US 7,614,652 B2
(45) Date of Patent: Nov. 10, 2009

(54) DISPLACEMENT INFORMATION DERIVATION DEVICE, OCCUPANT RESTRAINT SYSTEM, VEHICLE, AND DISPLACEMENT INFORMATION DERIVATION METHOD

(75) Inventors: Hiroshi Aoki, Minato-ku (JP); Kazuya Ooi, Minato-ku (JP)

(73) Assignee: Takata Corporation, Tokyo (JP)

( * ) Notice: Subject to any disclaimer, the term of this patent is extended or adjusted under 35 U.S.C. 154(b) by 227 days.

(21) Appl. No.: 11/460,291

(22) Filed: Jul. 27, 2006

(65) Prior Publication Data
US 2007/0023224 A1    Feb. 1, 2007

(30) Foreign Application Priority Data
Jul. 27, 2005   (JP)   ............... 2005-218001

(51) Int. Cl.
*B60R 21/16* (2006.01)
(52) U.S. Cl. .................................................. 280/735
(58) Field of Classification Search ................. 280/735; 180/274, 282; 307/10.1; 340/436, 668, 669; 701/45; 73/514.31, 514.32, 514.33
See application file for complete search history.

(56) References Cited

U.S. PATENT DOCUMENTS

| 4,625,113 | A | * | 11/1986 | Zierhut ..................... 250/338.1 |
| 5,335,749 | A | | 8/1994 | Taguchi et al. |
| 5,580,084 | A | | 12/1996 | Gioutsos |
| 5,723,789 | A | * | 3/1998 | Shannon ................... 73/514.31 |
| 6,039,345 | A | * | 3/2000 | Cech et al. ................... 280/735 |
| 6,203,060 | B1 | * | 3/2001 | Cech et al. ................... 280/735 |
| 6,552,662 | B1 | * | 4/2003 | Bomya et al. ............. 340/572.1 |
| 6,586,926 | B1 | * | 7/2003 | Bomya ................... 324/207.17 |
| 6,587,048 | B1 | * | 7/2003 | Bomya ..................... 340/573.1 |
| 7,097,201 | B2 | * | 8/2006 | Breed et al. ............... 280/730.2 |
| 7,190,161 | B2 | * | 3/2007 | Bomya ....................... 324/228 |
| 7,209,844 | B2 | * | 4/2007 | Merrick et al. ................. 702/65 |
| 7,212,895 | B2 | * | 5/2007 | Cech et al ..................... 701/45 |

FOREIGN PATENT DOCUMENTS

| DE | 197 03 173 A1 | 7/1998 |
| WO | WO 97/10128 | 3/1997 |

OTHER PUBLICATIONS

A search report dated Oct. 10, 2006, from the European Patent Office in corresponding European Application No. 06012681.0-2421.

* cited by examiner

*Primary Examiner*—Faye M. Fleming
(74) *Attorney, Agent, or Firm*—Fitch, Even, Tabin & Flannery

(57) ABSTRACT

A collision detection device is provided which is effective for improving the detection quality for detection of displacement of a vehicle component during a vehicle collision. In one form, the collision detection device to be installed in a vehicle comprises a coil sensor. The coil sensor includes a first coil which is arranged to face a door outer panel and a second coil which is arranged near the first coil and inside the outer diameter of the first coil and centered about a line perpendicular to the coil plane of the first coil. The coil sensor detects information about induced voltage due to magnetovariation via the second coil when the door outer panel is located in a distant region and detects information about variation in impedance via the first coil when the door outer panel is located in an adjacent region.

15 Claims, 6 Drawing Sheets

DISPLACEMENT INFORMATION DERIVATION DEVICE, OCCUPANT RESTRAINT SYSTEM, VEHICLE, AND DISPLACEMENT INFORMATION DERIVATION METHOD

FIELD OF THE INVENTION

The present invention relates to a technology for deriving information about displacement of vehicle components.

BACKGROUND OF THE INVENTION

Conventionally, there are known various vehicle collision sensors for detecting collision occurrence in the event of a vehicle collision. For example, Japanese Patent Unexamined Publication No. H05-45372 discloses an arrangement of canceling insulation between two conductors so as to make them conductive with each other when a vehicle side door is subjected to an impact exceeding a certain value in the event of a vehicle lateral collision, thereby detecting the occurrence of collision against the vehicle side door as an electric signal.

By the way, with regard to an arrangement of restraining a vehicle occupant by an occupant restraint system such as an airbag during a vehicle collision, the demand for technology of improving the occupant restraining capability has been increased. Accordingly, the demand for developing a sensor which is effective for improving the detection quality in order to detect rapidly and securely occurrence of a vehicle collision has also been increased.

SUMMARY OF THE INVENTION

The present invention has been made in view of the above problem and it is an object of the present invention to provide an effective technology for improving detection quality for detection of information about displacement of components in the event of a vehicle collision.

For achieving the object, the present invention is configured. Though the present invention is typically adapted to a technology for deriving information about displacement of vehicle components in an automobile, the present invention can be also adapted to a technology for deriving information about displacement of vehicle component in a vehicle other than the automobile. The "vehicle" used here includes various vehicles such as automobile, airplane, boat, train, bus, truck, and the like.

The first form of the present invention for achieving the aforementioned object is a displacement information deriving device.

The displacement information deriving device in the first form of the invention is a device for detecting information about a metallic vehicle component which is displaced by a vehicle collision and comprises at least a first coil, a second coil, a first detection unit, a second detection unit, and a deriving unit. The "vehicle collision" used here widely includes lateral collision, frontal collision, back end collision, rollover, and the like.

The first coil of this invention is arranged to face the metallic vehicle component which is displaced by a vehicle collision and is structured as a coil for producing AC magnetic field in the vehicle component when being energized with alternative current. The "vehicle component" is a member for composing the vehicle and all or a part of the member is made of a conductive substance or a magnetic substance containing, for example, steel, copper, aluminum, and/or ferrite. Typically, the vehicle component which is directly involved with a vehicle collision is a metallic outer panel (a door panel (door skin), a front panel, a rear panel, a hood panel, a trunk panel, or the like) forming the outer shell of the vehicle.

The second coil of this invention is structured as a coil arranged near the first coil and inside the outer diameter of the first coil and centered about a line perpendicular to the coil plane of the first coil. The aspect with regard to the arrangement of the second coil includes an aspect that the coil centers of the first coil and the second coil correspond with each other and an aspect that the coil planes of the first coil and the second coil correspond with each other.

Under the condition that the vehicle component is displaced from a distant region to an adjacent region toward the energized first coil during a vehicle collision and the vehicle component has different distances relative to said first coil between the distant region and the adjacent region, the first detection unit of this invention has a function of detecting, at least via the second coil, information about induced voltage caused by magnetovariation while the vehicle component is located in the distant region. The information about induced voltage used here includes induced voltage itself, phase and amplitude involved with variation in induced voltage.

The second detection unit of this invention has a function of detecting, at least via the first coil, information about variation in impedance while the vehicle component is located in the adjacent region. It should be noted that the distant region and the adjacent region may be partially superposed or completely separated from each other.

As the first coil is energized with alternate current, AC magnetic field is produced in the vehicle component so as to generate eddy current in the vehicle component according to the law of electromagnetic induction. Also by the eddy current, magnetic field is produced. A part of the magnetic field is interlinked with the first coil. As a result, in the first coil, the magnetic flux due to the eddy current flowing through metallic substance which forms the vehicle component is added to the magnetic flux due to the supplied current. These magnetic fluxes produce induced voltage so as to produce magnetic field in the first coil. As a result, the AC impedance of the first coil is varied by bringing the vehicle component closer to the first coil.

During this, the second coil is influenced by magnetovariation generated at the periphery thereof as well as the variation in AC impedance in the first coil so that induced voltage is produced in the second coil by magnetovariation. Therefore, information about variation in induced voltage is detected via the second coil. Particularly, the position inside the outer diameter of the first coil and about a line perpendicular to the coil plane of the first coil is a region where magnetic field lines form relatively large magnetic-field loop, i.e., a region having relatively strong magnetic field among magnetic fields produced in the first coil. Accordingly, the second coil arranged at the position can exhibit sensitivity excellent for detecting the magnetovariation in the distant region distant from the coil sensor as variation in induced voltage. In addition, the second coil detects magnetovariation at the periphery thereof from signals having frequency components different from the driving frequency. The magnetovariation is produced by variation in magnetic permeability of peripheral space, and magnetostrictive field and noise due to deformation of the vehicle component. As mentioned above, the second coil of this invention has a function of detecting a variety of information about variation in magnetic field at the periphery thereof and thus quickly detecting information about deformation of the vehicle component by using a variety of information.

The deriving unit has a function of deriving information about displacement of the vehicle component based on the information detected by the first detection unit and the second detection unit when the vehicle component is displaced toward the coil sensor during a vehicle collision. Accordingly, information about displacement of the vehicle component during the vehicle collision can be derived by the deriving unit. The "information about displacement of the vehicle component" used here includes displacement distance, displacement speed, and/or displacement acceleration.

With regard to detection of a vehicle component by using a coil sensor, there has been a demand for a technology effective for improving the detection sensitivity. The reason is as follows. If the coil sensor is arranged close to the object as the vehicle component in order to get higher sensitivity for detecting the object, there is a problem that it is impossible to ensure desired stroke for detection. On the other hand, if the coil sensor is arranged at a distance from the object, there is a problem that increase in size of the coil sensor is needed and a problem that the installation location is limited. In addition, it has been known that the detection quality varies between a state the vehicle component and the coil sensor are spaced apart from each other and a state that they are located close to each other. Specifically, variation in AC impedance is not simply proportional to the distance between the vehicle component and the detection region. In addition, the rate of the variation increases as the vehicle component comes closer to the detection region of the coil sensor. Especially, the AC impedance rapidly varies in the close vicinity of the detection region of the coil sensor.

Therefore, the inventors of the present invention keenly examined the structure of coil sensor of this kind in order to improve the detection sensitivity of the coil sensor. As a result of this, the inventors found a way of employing a first coil and a second coil which are arranged as mentioned above so that the information about displacement in the distant region is detected mainly by the second coil and information about displacement in the adjacent region is detected mainly by the first coil. This way enables the improvement of sensitivity for detecting the vehicle component (increase in detection distance) throughout the distant region and the adjacent region without increasing the size of the coil sensor so as to ensure desired detection quality for deriving information about displacement of the vehicle component.

Accordingly, this arrangement provides a displacement information deriving device effective for improving the detection quality for detection of information about displacement of a vehicle component. As further function and effect, the detection sensitivity can be ensured without increasing the size of the coil sensor, thereby enabling both the miniaturization and improvement of the detection sensitivity of the coil sensor.

Information about displacement of the vehicle component derived by the deriving unit of this invention may be suitably used for controlling occupant restraint devices such as an airbag device and a seat belt device which operate for restraint of the vehicle occupant in the event of a vehicle collision and for controlling an annunciator which conducts indication output and/or audio output for annunciating the occurrence of vehicle collision and may be suitably used for controlling other object(s) to be controlled. Typically, the invention is adapted to such an arrangement that control signals are outputted to the airbag device and the seat belt device when it is determined that a vehicle collision occurs based on information about displacement of the vehicle component.

The second form of the present invention for achieving the aforementioned object is a displacement information deriving device.

In the displacement information deriving device in the second form, the first coil and the second coil of the second form are arranged such that coil centers thereof correspond with each other.

According to this arrangement, the second coil is arranged at a position where magnetic field is relatively strong among magnetic fields generated in the first coil so that the second coil arranged at the position exhibits excellent sensitivity for detecting magnetovariation in the distant region as variation in induced voltage.

The third form of the present invention for achieving the aforementioned object is a displacement information deriving device.

In the displacement information deriving device of the third form, the first coil and the second coil of the second form are arranged such that coil planes thereof correspond with each other.

According to this arrangement, the second coil is arranged at a position where magnetic field is relatively strong among magnetic fields generated in the first coil so that the second coil arranged at the position exhibits further excellent sensitivity for detecting magnetovariation in the distant region as variation in induced voltage.

The fourth form of the present invention for achieving the aforementioned object is an occupant restraint system.

The occupant restraint system of the fourth form of the invention comprises at least a displacement information deriving device in any of the previous forms of the invention, an occupant restraint device, and a control device.

The occupant restraint device of this embodiment is a device which operates to restrain a vehicle occupant in the event of a vehicle collision. The "occupant restraint device" used here includes occupant restraint devices such as an airbag device (airbag module) and a seat belt device.

The control device of this embodiment is a device having at least a function of controlling the occupant restraint device base on the information derived by the deriving unit, i.e., the information about displacement of the vehicle component. Typically, the invention may employ such an arrangement that when it is determined that a vehicle collision occurs based on information about displacement of the vehicle component, control signals are outputted to the airbag device and the seat belt device. The invention may also employ such an arrangement that impact energy at the collision is estimated based on the information about displacement of the vehicle component and the occupant restraint mode in the airbag device or the seat belt device is varied according to the estimated impact energy. The control device may be provided exclusively for controlling the occupant restraint device or used not only for controlling the occupant restraint device but also for controlling the actuation of a running system and/or an electric system.

This arrangement allows the occupant restraint device to be controlled using highly accurate information about displacement of the vehicle component obtained by the displacement information deriving device, thereby achieving thorough restraint of the vehicle occupant.

The fifth form of the present invention for achieving the aforementioned object is an occupant restraint system.

In the occupant restraint system in the fifth form, the coils of the displacement information deriving device of the fourth form are arranged to face a door outer panel of a vehicle door as the vehicle component. In addition, the occupant restraint device of the fourth form is adapted to restrain the vehicle occupant in the event of a vehicle lateral collision. In cases an airbag device is employed as the occupant restraint device, employed airbag device may be of a type having an airbag to be accommodated in a seat, a pillar, an upper roof rail, or the like. This arrangement enables thorough restraint of the vehicle occupant, especially during a lateral collision on the vehicle.

The sixth form of the present invention for achieving the aforementioned object is a vehicle.

In the sixth form of the invention, the vehicle comprises at least a running system including an engine, an electrical system, a drive control device, a vehicle component, a sensor device, and a control signal output device.

The running system including an engine is a system relating to driving of the vehicle by the engine. The electrical system is a system relating to electrical parts used in the vehicle. The drive control device is a device having a function of conducting the drive control of the running system and the electrical system. The vehicle component is a metallic member which composes the vehicle and which is displaced by a vehicle collision. For example, the vehicle component is an outer panel (a door panel, a front panel, a rear panel, a hood panel, a trunk panel, or the like) which forms the outer shell of the vehicle and which is made of a metal (for example, metal containing steel, copper, aluminum, and/or ferrite). The sensor device is a device having a function of deriving information about displacement of the vehicle component.

In this invention, the sensor device comprises a displacement information deriving device of any one of the first, second, or third forms of the invention. The control signal output device is a device having a function of outputting control signal to an object to be controlled based on information derived by the sensor device. The "object to be controlled" used here includes vehicle occupant restraint devices such as an airbag device and a seat belt device which operate for restraint of the vehicle occupant in the event of a vehicle collision and an annunciator which conducts indication output and/or audio output for annunciating the occurrence of vehicle collision. The control signal output device may be provided exclusively for controlling the object to be controlled or used not only for controlling the object to be controlled but also for controlling the actuation of a running system and/or an electric system.

According to this arrangement, a vehicle in which highly accurate information about displacement of the vehicle component obtained by the displacement information deriving device is used for controlling various objects to be controlled relating to the vehicle can be obtained.

The seventh form of the present invention for achieving the aforementioned object is a displacement information deriving method.

The displacement information deriving method of the seventh form employs a first coil which is arranged to face a metallic vehicle component which is displaced by a vehicle collision and a second coil which is arranged near the first coil and inside the outer diameter of the first coil and is centered about a line perpendicular to the coil plane of the first coil. The vehicle component is displaced from a distant region to an adjacent region toward the energized first coil during the vehicle collision and the vehicle component has different distances relative to the first coil between the distant region and the adjacent region. Information about induced voltage caused by magnetovariation while the vehicle component is located in the distant region is detected via the second coil. On the other hand, information about variation in impedance while the vehicle component is located in the adjacent region is detected via the first coil. Based on the aforementioned information, information about displacement of the vehicle component is derived. This method may be achieved actually by the displacement information deriving device of the first form of the invention.

Therefore, this method enables improvement of detection quality for detection of information about displacement of the vehicle component during a vehicle collision.

As described in the above, the present invention employs an arrangement including a first coil which is arranged to face a metallic vehicle component which is displaced by a vehicle collision and a second coil arranged near the first coil and inside the outer diameter of the first coil and centered about a line perpendicular to the coil plane of the first coil, wherein information about induced voltage due to magnetovariation when the door outer panel is located in a distant region is detected via the second coil, while information about variation in impedance when the vehicle component is located in an adjacent region is detected via the first coil, thereby enabling improvement of detection quality for detection of information about displacement of a vehicle component during a vehicle collision.

DETAILED DESCRIPTION OF THE PREFERRED EMBODIMENTS

Hereinafter, description will be made as regard to an occupant restraint system 100 as an embodiment of the "occupant restraint system" according to the present invention with reference to FIG. 1 and FIG. 6. This embodiment employs an airbag module as an occupant restraint system. The airbag module comprises an airbag which is inflatable. Though the airbag module described in this embodiment is adapted as an airbag module for a vehicle occupant (driver) on a right-side vehicle seat inside a vehicle cabin, the airbag module of this embodiment may also be adapted as an airbag module for a vehicle occupant on any of vehicle seats such as a driver seat, a front passenger seat, and a rear seat.

Figure 1:
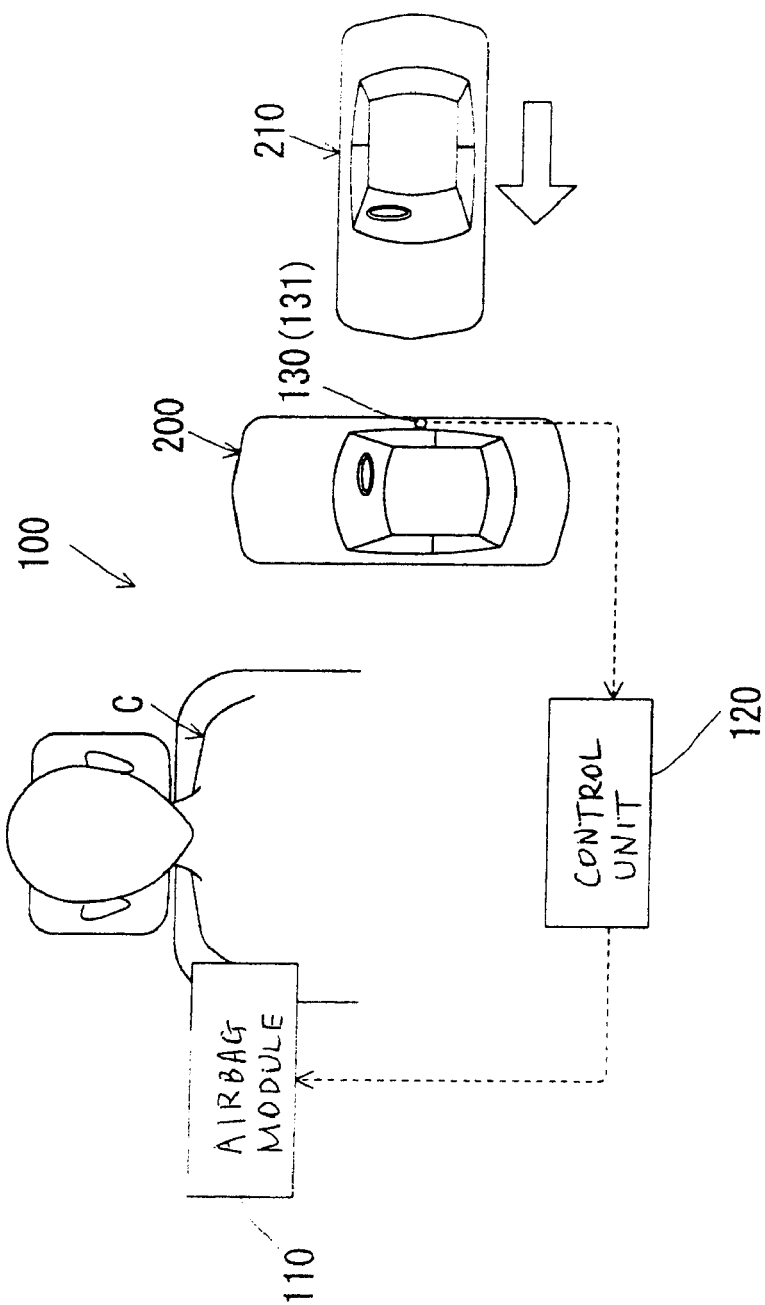
FIG. 1 is an illustration showing an occupant restraint system according to an embodiment in a state installed in a subject vehicle.

An occupant restraint system 100 of this embodiment is schematically shown in FIG. 1 in a state where it is installed in a subject vehicle 200. In this embodiment, as will be described in detail later, a collision detection device 130 as a component of the occupant restraint system 100 is installed in a vehicle door which is opened and closed when a vehicle occupant C gets on or off the subject vehicle 200. In addition to the collision detection device 130 of the occupant restraint system 100, another detection device and the occupant restraint system may be installed to a vehicle side member such as a trim, a pillar, and the like.

As shown in FIG. 1, the subject vehicle 200 as a "vehicle" of the present invention comprises a large number of vehicle components composing the vehicle such as a running system including an engine and other parts for driving the vehicle, an electrical system for electrical parts used in the vehicle, and a drive control device for conducting the drive control of the running system and the electrical system. Particularly in this embodiment, the occupant restraint system 100 is installed in the subject vehicle 200.

The occupant restraint system 100 is structured as a system having a function of protecting the vehicle occupant C in the vehicle seat in the event of a vehicle accident such as a lateral collision (for example, a lateral collision by another vehicle 210) or rollover of the subject vehicle 200. The occupant restraint system 100 comprises at least an airbag module 110, a control unit (ECU) 120, and the collision detection device 130.

The airbag module 110 comprises at least an airbag and a gas supplying device, but not specifically shown. The airbag can inflate and deflate and is adapted to be inflated by gas supply from the gas supplying device so as to deploy into an occupant restraining area when a vehicle collision occurs. The airbag module 110 corresponds to "an occupant restraint device" or "an object to be controlled" of the present invention.

The control unit 120 comprises a CPU (central processing unit), an input/output unit, a storage unit, an actuating unit, a peripheral unit, and the like, but not specifically shown. In this embodiment, the control unit 120 is electrically connected to the airbag module 110 so as to allow transmission/reception of detected signals and control signals therebetween. Specifically, inputted into the control unit 120 is information (detected signal) detected by the collision detection device 130 as an input signal. The control unit 120 is adapted to output a control signal to the airbag module 110 according to the input signal from the collision detection device 130. The control unit 120 corresponds to "a control device" or "a control signal output device" of the present invention.

The control unit 120 may be provided exclusively for controlling the occupant restraint system 100 or used not only for controlling the occupant restraint system 100 but also for controlling other vehicle components or for controlling the whole vehicle.

The collision detection device 130 is structured as a detection device (sensor device) for obtaining information about displacement of a door outer panel 12, as will be described later, as one of the vehicle components. The collision detection device 130 corresponds to "a displacement information deriving device" or "a sensor device" of the present invention.

Figure 2:
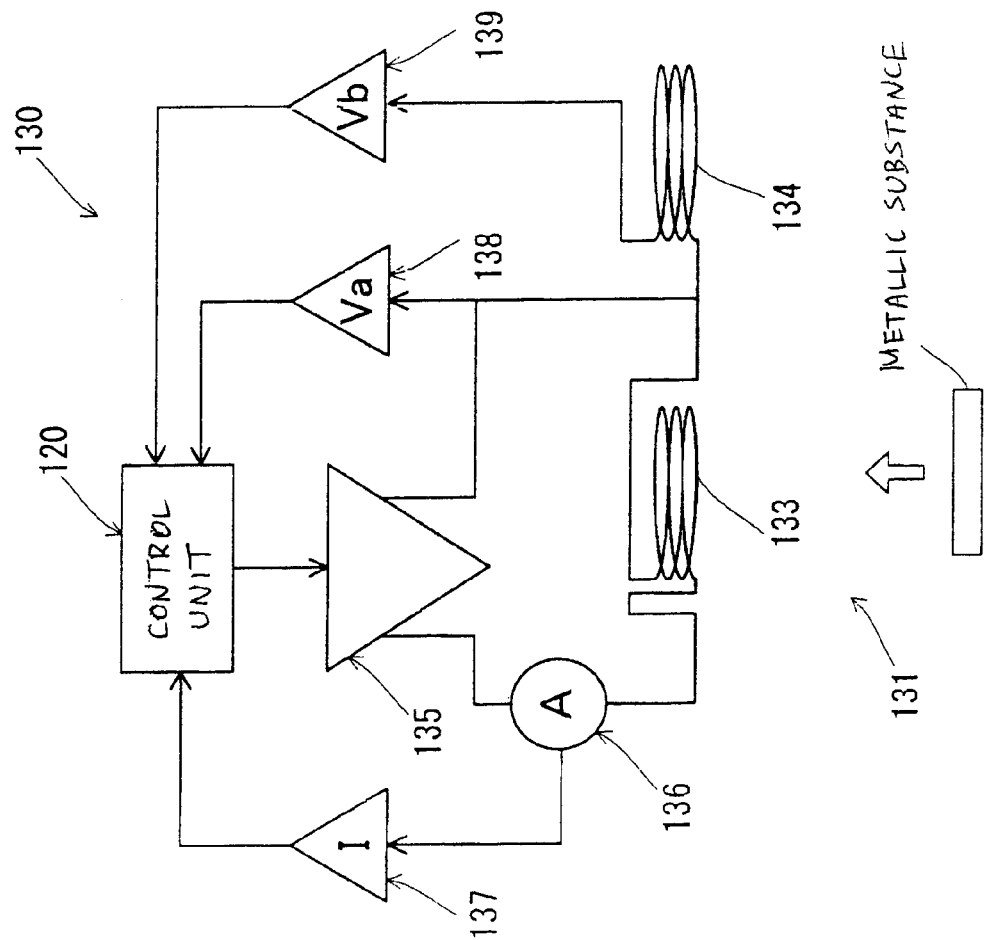
FIG. 2 is a diagram showing a driving circuit of a collision detection device shown in FIG. 1.

FIG. 2 shows a driving circuit of the collision detection device 130 shown in FIG. 1.

As shown in FIG. 2, the collision detection device 130 comprises at least a coil sensor 131, an AC power source 135, an ammeter 136, a current output unit 137, a first voltage output unit 138, and a second voltage output unit 139. In the coil sensor 131 shown in FIG. 2, a first coil 133 and a second coil 134 which have respective coil windings are illustrated separately. Actually however, the first coil 133 and the second coil 134 are accommodated in a single sensor housing (a sensor housing 132 as will be described later). The AC power source 135 is a device for supplying alternative current to the first coil 133 of the coil sensor 131 based on the control signal from the control unit 120. The ammeter 136 has a function of detecting current flowing through the first coil 133. The current output unit 137 has a function of detecting information about variation in current (phase and amplitude) flowing through the first coil 133. The first voltage output unit 138 has a function of detecting information about variation in voltage (phase and amplitude) of the first coil 133, while the second voltage output unit 139 has a function of detecting information about variation in voltage (phase and amplitude) of the second coil 134.

In the collision detection device 130 having the aforementioned arrangement, as the first coil 133 is energized with alternative current by activation of the AC power source 135, AC magnetic field is produced in metallic substance (conductive substance or magnetic substance) around the first coil 133 so as to generate eddy current in the metallic substance according to the law of electromagnetic induction. Also by the eddy current, magnetic field is produced. A part of the magnetic field is interlinked with the first coil 133. As a result, in the first coil 133, the magnetic flux due to the eddy current flowing through the metallic substance is added to the magnetic flux due to the current supplied from the AC power source 135. These magnetic fields produce induced voltage so as to produce magnetic field in the first coil 133. Information about variation in current and information about variation in voltage in the first coil 133 during this are detected by the current output unit 137 and the first voltage output unit 138. Since the ratio of the voltage produced in the first coil 133 relative to the current flowing through the first coil 133 is AC impedance of the first coil 133, the AC impedance of the first coil 133 is varied by bringing the metallic substance close to the first coil 133. The first coil 133 corresponds to "a first coil" of the present invention.

At the same time, the second coil 134 is influenced by variation in magnetic field generated at the periphery thereof in addition to the variation in the AC impedance of the first coil 133. The variation of the magnetic field produces induced voltage in the second coil 134. Information about variation in induced voltage (phase and amplitude) is detected by the second voltage output unit 139 through the second coil 134. The second coil 134 also detects magnetovariation at the periphery thereof from signals having frequency components different from the driving frequency of the AC power source 135. The magnetovariation is produced by variation in magnetic permeability of peripheral space, and magnetostrictive field and noise due to deformation of the metallic substance. As mentioned above, the second coil 134 of this embodiment has a function of detecting a variety of information about variation in magnetic field at the periphery thereof and thus quickly detecting information about displacement of the metallic substance by using a variety of information. The second coil 134 corresponds to "a second coil" of the present invention.

Figure 3:
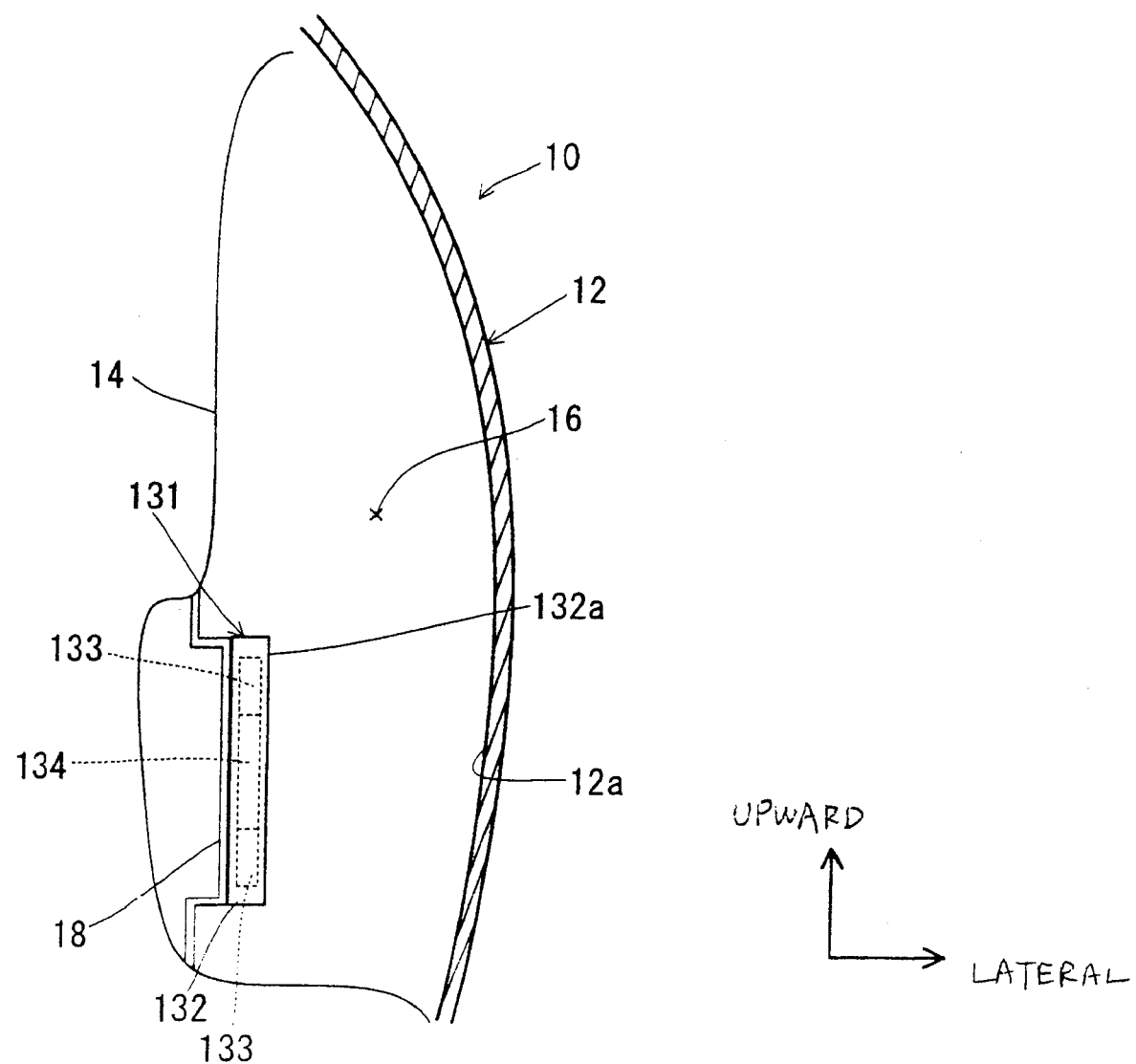
FIG. 3 is an illustration showing the arrangement of a vehicle door in section according to the embodiment and showing an installation embodiment of a coil sensor.

An installation embodiment of the coil sensor 131 of the collision detection device 130 having the aforementioned arrangement will be described with reference to FIG. 3. FIG. 3 is an illustration showing the arrangement of a vehicle door 10 in section and particularly showing the installation embodiment of the coil sensor 131.

As shown in FIG. 3, the vehicle door 10 which is used for allowing the vehicle occupant C to get on or off the vehicle comprises a door outer panel (sometimes called "door skin") 12 as a metallic plate member composing an outer wall of the vehicle and a door inner panel 14 composing an inner wall of the vehicle. The coil sensor 131 is installed in a space 16 formed (defined) between the door outer panel 12 and the door inner panel 14. Specifically, a bracket 18 is disposed in the space 16 near the door inner panel 14 and the coil sensor 131 is supported by the bracket 18. In the state shown in FIG. 3, a sensor surface 132a of the coil sensor 131 is arranged to face the door outer panel 12 which serves as an object to be detected by the coil sensor 131. The door outer panel 12 is adapted as a conductive substance or a magnetic substance containing, for example, steel, aluminum, and/or ferrite. A door beam for reinforcement may be disposed on an inner surface 12a of the door outer panel 12 and the door beam may be employed as the object to be detected instead of the door outer panel 12.

Figure 4:
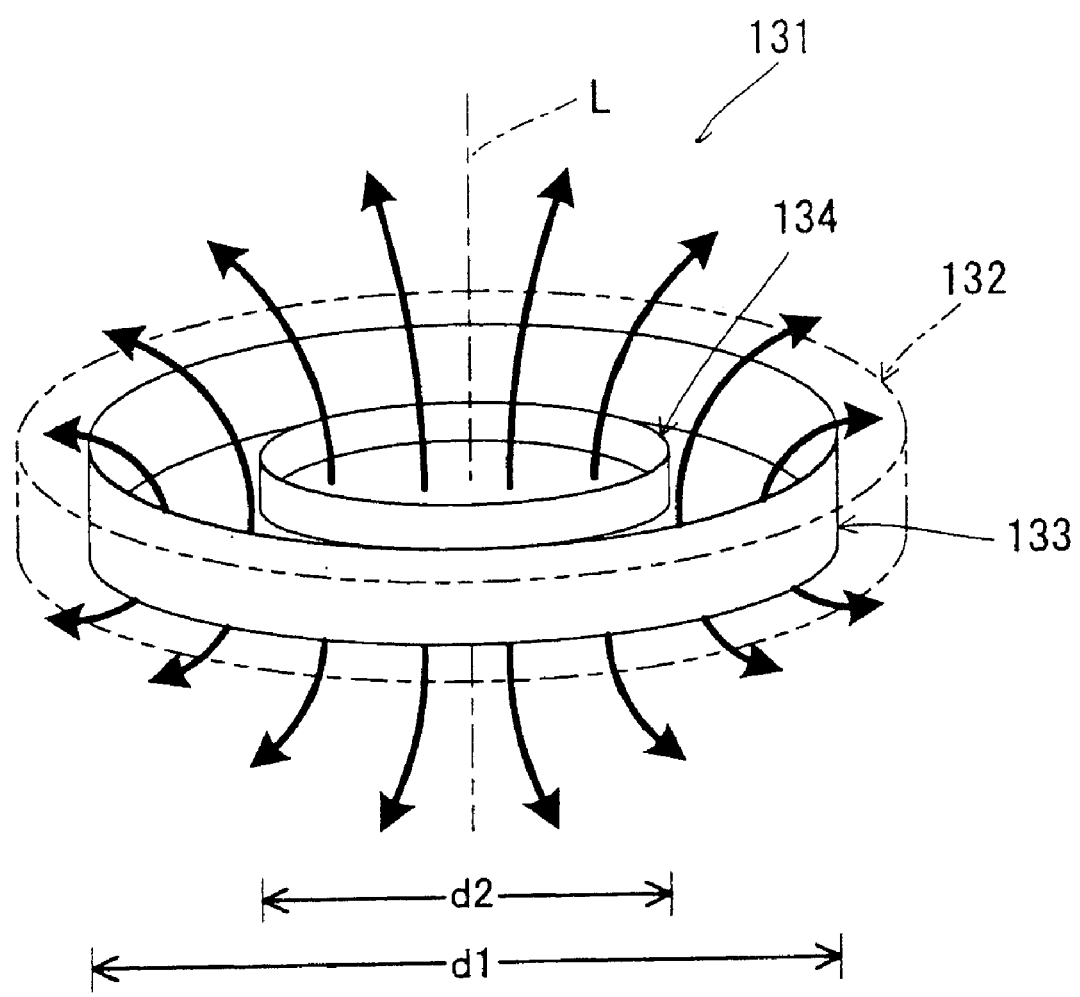
FIG. 4 is an illustration showing a specific positional relation of a first coil and a second coil in the coil sensor of the embodiment.

FIG. 4 shows a specific positional relation of the first coil 133 and the second coil 134 in the coil sensor 131 of this embodiment.

As shown in FIG. 4, the first coil 133 is adapted to have an outer diameter d1 which is larger than an outer diameter d2 of the second coil 134. The second coil 134 is arranged inside of the first coil 133. The first coil 133 and the second coil 134 are adapted such that coil centers thereof correspond with a center line L1 and coil planes (coil extending surfaces) thereof correspond with each other. In other words, the second coil 134 is arranged near the first coil 133 and inside the outer diameter of the first coil 133 and is centered about a line perpendicular to the coil plane of the first coil 133. Specifically, the second coil 134 is arranged at the center of the coil plane of the first coil 133. The center of the coil plane is a region for forming a magnetic loop of which lines of magnetic force indicated by arrows in FIG. 4 are relatively large and of which magnetic field is relatively strong among magnetic fields generated in the first coil 133. Therefore, the second coil 134 arranged at the center of the coil plane of the coil 133 can exhibit excellent sensitivity for detecting magnetovariation particularly in the distance as variation in induced voltage. By setting the impedance of the second coil 134 to be higher than that of the first coil 133, the sensitivity for detecting variation in induced voltage can be improved. Therefore, the second coil 134 having the aforementioned positional relation improves the sensitivity for detecting the object to be detected (increases the detection distance) without increasing the coil size.

Figure 5:
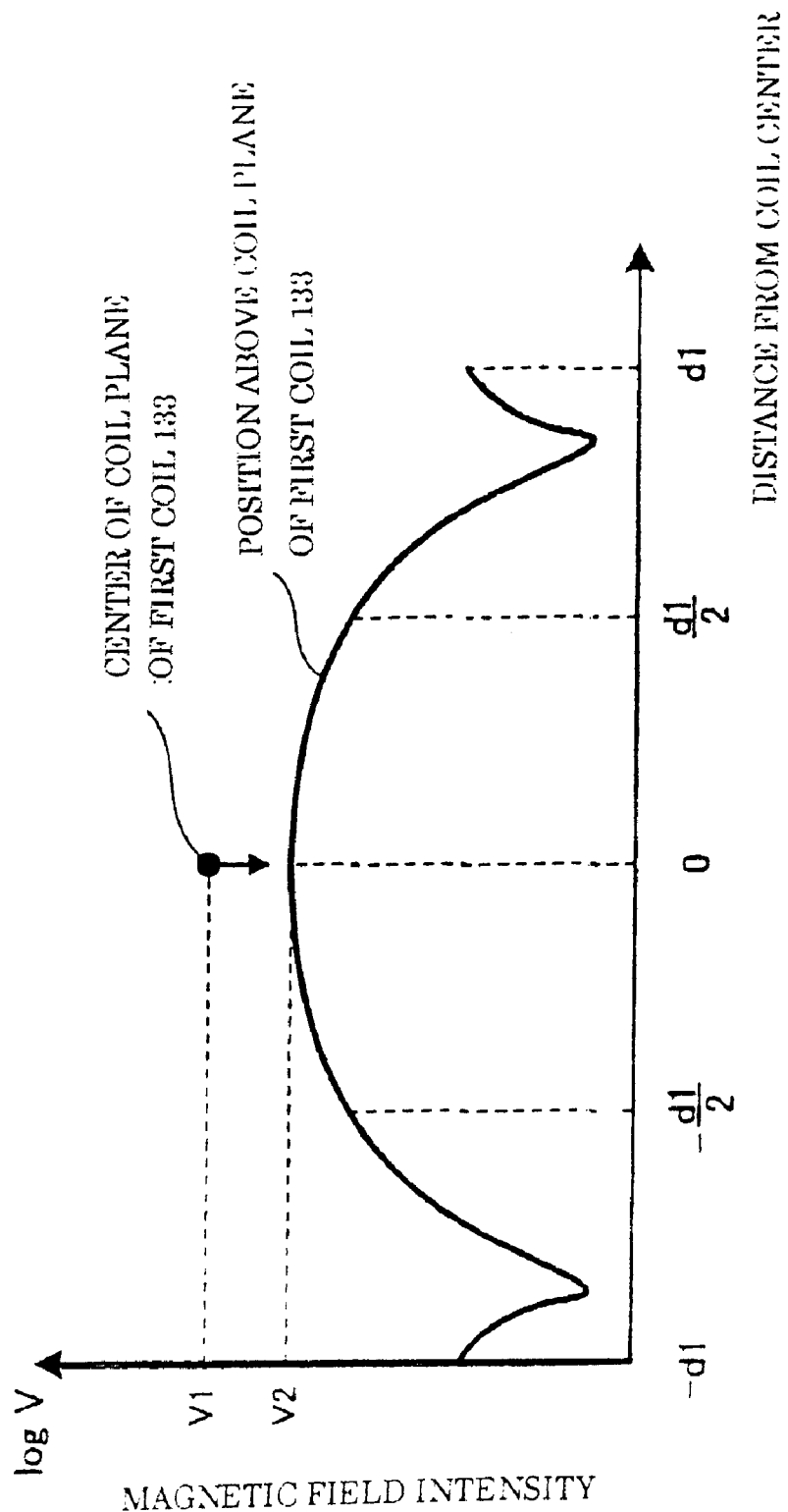
FIG. 5 is an illustration for explaining the spread of magnetic field about the first coil of the embodiment.

FIG. 5 is an illustration for explaining the spread of magnetic field about the first coil 133 of this embodiment. Inventors of the present invention carried out tests for measuring the magnetic field intensity at periphery of the coil in order to recognize the spread of magnetic field about the first coil 133. Specifically, the magnetic field intensity at positions shifted in a lateral direction from the coil center at a predetermined height above the coil plane of the first coil 133 (for example, the height from the coil plane of the first coil 133 corresponds to a half of the outer diameter d1 of the first coil 133). As a result of measurement, it was recognized that the highest magnetic field intensity V2 is obtained at the coil center among positions in the lateral direction, wherein the magnetic field intensity V2 is slightly lower than the magnetic field intensity V1 obtained at the center of the coil plane of the first coil 133. Consequently, it is preferable that the second coil 134 is positioned near the first coil 133 and inside the outer diameter of the first coil 133 such that the coil center of the second coil 134 generally corresponds with the coil center of the first coil. It is further preferable that the second coil 134 is positioned at the center of the coil plane of the first coil 133 as shown in FIG. 4.

The action and function of the coil sensor 131 will be described with reference to FIG. 6 in addition to FIG. 3. FIG. 6 is an illustration showing the arrangement of the vehicle door 10 in section and showing a process of deformation of the door outer panel 12 of the vehicle door 10 due to a lateral collision of the subject vehicle 200.

Here, it is assumed that the door outer panel 12 of the vehicle door 10 as shown in FIG. 3 is displaced (sometimes called "deformed" or "moved") toward the coil sensor 131 by impact from a side (right side in FIG. 3) due to a vehicle collision (a lateral collision on the subject vehicle 200 by another vehicle 210 in FIG. 1). In this case, the door outer panel 12 shown in FIG. 3 is deformed into, for example, the state shown in FIG. 6. The state shown in FIG. 6 is a state where the door outer panel 12 is deformed from the position shown by two-dot chain lines (the state shown in FIG. 3) to the position shown by solid lines so that a region of the door outer panel 12 facing the coil sensor 131 comes close to the coil sensor 131.

Figure 6:
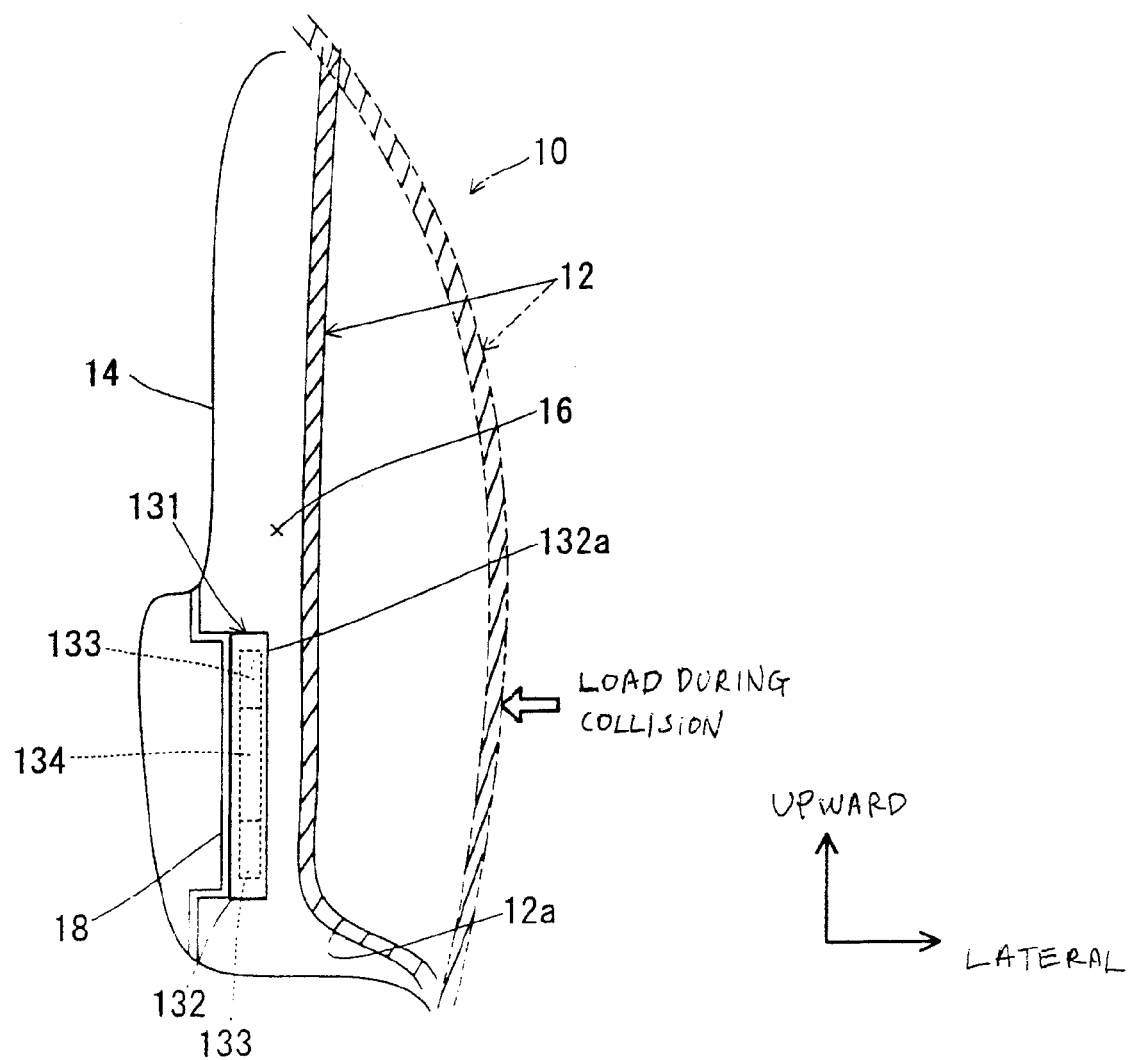
FIG. 6 is an illustration showing the arrangement of the vehicle door in section and showing a process of deformation of a door outer panel of the vehicle door due to a lateral collision of the subject vehicle.

When the door outer panel 12 is displaced from a distant region where is spaced apart from the coil sensor 131 to an adjacent region where is close to the coil sensor 131 between the state shown in FIG. 3 and the state shown in FIG. 6, information accompanied with the displacement (deformation) of the door outer panel 12 is detected continuously or at regular time intervals by the coil sensor 131 and is processed by the control unit 120. The process by the control unit 120 derives information about displacement of the door outer panel 12.

Specifically, while the door outer panel 12 is located within the distant region such as the position shown in FIG. 3 or any position until the position shown in FIG. 6, displacement of the door panel 12 is detected by the second coil 134 of the coil sensor 131 which has higher sensitivity for detecting magnetovariation in the distance as mentioned above. At this point, the second coil 134 detects variation in induced voltage generated in the second coil 134 and detects magnetovariation at the periphery thereof from a signal having frequency components different from those of the driving frequency of the AC power source 135. The magnetovariation is caused by variation in magnetic permeability in the peripheral space, magnetostrictive magnetic field and/or noise due to deformation of the metallic substance. In this embodiment, the mechanism of detecting information about induced voltage caused by magnetovariation while the door outer panel 12 is located in the distant region is formed of the second coil 134, the control unit 120, and the like. This mechanism corresponds to "a first detection unit" of the present invention.

On the other hand, while the door outer panel 12 is located in the adjacent region such as the position shown in FIG. 6 or any position at the periphery thereof, displacement of the door panel 12 is detected mainly by the first coil 133 of the coil sensor 131. At this point, the first coil 133 detects variation in AC impedance. As mentioned above, in this embodiment, the mechanism of detecting information about variation in impedance while the door outer panel 12 is located in the adjacent region is formed of the first coil 133, the control unit 120, and the like. This mechanism corresponds to "a second detection unit" of the present invention. The distant region and the adjacent region for the door outer panel 12 may be partially superposed or completely separated from each other.

The control unit 120 previously stores relations between information about magnetovariation at the periphery of the second coil 134 and about variation in AC impedance and information about displacement of the door outer panel 12 and refers information which is actually detected to the stored relations so as to derive information about displacement of the door outer panel 12. As the information about displacement of the door outer panel 12, displacement distance, displacement speed, and/or displacement acceleration may be suitably employed.

Based on the derived information about displacement of the door outer panel 12, information about lateral collision of the subject vehicle 200 is derived and the airbag module 110 is controlled according to the information about the lateral collision. As the information about lateral collision, information whether or not a lateral collision actually occurs and information about impact energy at the lateral collision may be suitably employed. By this control, the airbag of the airbag module 110 is inflated and deployed so as to restrain a vehicle occupant (the vehicle occupant C in FIG. 1) with reducing impact acting on the side (head, neck, shoulder, chest, stomach, knee, lower leg, and the like) of the vehicle occupant.

For deriving information about collision of the subject vehicle 200, information detected by another sensor may be employed in addition to information detected by the coil sensor 131. As the another sensor, for example, an acceleration sensor for detecting acceleration in three axes (X-axis, Y-axis, Z-axis) acting on the subject vehicle 200 may be employed.

With regard to detection of an object such as the door outer panel 12 by using a coil sensor, there has been a demand for technology effective for improving the sensitivity for detecting the object. The reason is as follows. If the coil sensor is arranged close to the object in order to get higher sensitivity for detecting the object, there is a problem that it is impossible to ensure desired stroke for detection. On the other hand, if the coil sensor is arranged at a distance from the object, there is a problem that increase in size of the coil sensor is needed and a problem that the installation location is limited. Therefore, the inventors of the present invention keenly examined the structure of coil sensor of this kind in order to improve the detection sensitivity of this coil sensor.

As a result of this, the inventors found a way that displacement of the door outer panel 12 in the distant region is detected mainly by the second coil 134 and displacement in the adjacent region is detected mainly by the first coil 133. This way enables the improvement of sensitivity for detecting the door outer panel 12 (increase in detection distance) throughout the distant region and the adjacent region without increasing the size of the coil sensor so as to ensure desired detection quality for deriving information about displacement of the door outer panel 12, thereby rapidly detecting occurrence of a lateral collision of the subject vehicle 200.

As mentioned above, this embodiment can provide a collision detection device 130 and a collision detection method enabling the improvement in capability of detecting information about displacement of the door outer panel 12. Specifically, the capability of detecting the door outer panel 12 by the coil sensor 131 can be stabilized over the distant region where the door outer panel 12 and the coil sensor 131 are spaced apart from each other and the adjacent region where these are close to each other. As further function and effect, the detection sensitivity can be ensured without increasing the size of the coil sensor 131, thereby enabling both the miniaturization and improvement of the detection sensitivity of the coil sensor 131.

Further, according to this embodiment, the airbag module 110 can be quickly controlled using highly accurate information about displacement of the door outer panel 12 which is obtained by the collision detection device 130, thereby achieving thorough restraint of the vehicle occupant.

Furthermore, this embodiment can provide a vehicle 200 in which highly accurate information about displacement of the door outer panel 12 is used for controlling various objects to be controlled in the vehicle.

The present invention is not limited to the aforementioned embodiment and various applications and modifications may be made. For example, the following respective embodiments based on the aforementioned embodiment may be carried out.

Though the aforementioned embodiment has been described with regard to a case where, with regard to the arrangement of the coil sensor 131, the second coil 134 is arranged at the center portion of the coil plane of the first coil 133, the second coil 134 may be arranged in any places within the outer diameter of the first coil 133 such that the second coil 134 is centered about a line perpendicular to the coil plane of the first coil 133 in the present invention.

Though the aforementioned embodiment has been described with regard to a case of the collision detection device 130 which is adapted to technology for detecting occurrence of lateral collision, the collision detection device 130 may be adapted to technology for detecting vehicle collision other than lateral collision, for example, frontal collision (full wrap collision, offset collision, pole frontal collision, oblique collision), rear end collision, and rollover. In this case, the installation location of a coil sensor 131 mounted in a vehicle door 10 as this embodiment can be suitably set according to the aspect of vehicle collision.

Though the aforementioned embodiment has been described with regard to a case where information about displacement of the door outer panel 12 is used for controlling the airbag module 110 which operates for restraint of the vehicle occupant in the event of a vehicle collision, information about displacement of the door outer panel 12 may be used for controlling an occupant restraint device such as a seat belt device and for controlling an annunciator which conducts indication output and/or audio output for annunciating an occurrence of a vehicle collision.

Though the aforementioned embodiment has been described with regard to the arrangement of the occupant restraint system to be installed in an automobile, the present invention can be adapted to arrangements of occupant restraint systems to be installed in various vehicles other than automobile such as an airplane, a boat, a train, a bus, a truck, and the like.

What is claimed is:

1. A collision detection device for a vehicle, the collision detection device comprising:
   an electrical power source;
   an electronic sensor for detecting displacement of a metallic vehicle component;
   a first portion of the sensor driven by the electrical power source to generate a magnetic field in the metallic vehicle component; and
   a second portion of the sensor separate and spaced from the first portion, the second portion having a predetermined electrical characteristic that is variably responsive to the displacement of the metallic vehicle component.

2. The collision detection device of claim 1 wherein the electronic sensor comprises a coil sensor.

3. The collision detection device of claim 1 wherein the first and second portions comprise first and second coils, respectively, with the first coil extending about the second coil.

4. A collision detection device for a vehicle, the collision detection device comprising:
   an electrical power source;
   an electronic sensor for detecting displacement of a metallic vehicle component;
   a first portion of the sensor driven by the electrical power source to generate a magnetic field in the metallic vehicle component; and
   a second portion of the sensor separate and spaced from the first portion, the second portion having a predetermined electrical characteristic that is variably responsive to the displacement of the metallic vehicle component, wherein the first portion has a predetermined electrical characteristic that is variable responsive to the displacement of the metallic vehicle component, with the first and second portions being arranged and configured so that the second portion is operable to have an optimized response to displacement of the metallic vehicle component at distances further from the electronic sensor than at which the first portion has an optimized response to displacement of the metallic vehicle component.

5. The collision detection device of claim 4 wherein the first portion predetermined electrical characteristic comprises impedance, and the second portion predetermined electrical characteristic comprises induced voltage.

6. A collision detection device for a vehicle, the collision detection device comprising:
   an electrical power source;
   an electronic sensor for detecting displacement of a metallic vehicle component;
   a first portion of the sensor driven by the electrical power source to generate a magnetic field in the metallic vehicle component; and
   a second portion of the sensor separate and spaced from the first portion, the second portion having a predetermined electrical characteristic that is variably responsive to the displacement of the metallic vehicle component,
   wherein the first and second portions comprise first and second coils, respectively, with the second coil having a predetermined impedance that is greater than a predetermined impedance of the first coil.

7. The collision detection device of claim 1 including a control unit that receives information from at least the second portion of the sensor relating to changes in the predetermined electrical characteristic thereof for deriving information relating to the displacement of the metallic vehicle component.

8. The collision detection device of claim 7 in combination with an occupant restraint device for restraining a vehicle occupant during vehicle emergency conditions, with the control unit controlling operation of the occupant restraint device based on the derived information.

9. A method of detecting information relating to displacement of a vehicle component, the method comprising:
   energizing a first portion of an electronic sensor with an electrical power source that is distinct from the electronic sensor;
   generating a magnetic field in a predetermined metallic vehicle component;
   arranging a second portion of the electronic sensor in a predetermined spaced position relative to the first portion;
   detecting variation in a predetermined electrical characteristic of the second portion responsive to displacement of the predetermined metallic vehicle component; and
   deriving information regarding displacement of the predetermined metallic vehicle component based on the detected variation.

10. The method of claim 9 wherein the magnetic field in the predetermined metallic vehicle component is generated by the energized first portion of the electronic sensor.

11. A method of detecting information relating to displacement of a vehicle component, the method comprising:
   energizing a first portion of an electronic sensor;
   generating a magnetic field in a predetermined metallic vehicle component;
   arranging a second portion of the electronic sensor in a predetermined spaced position relative to the first portion;
   detecting variation in a predetermined electrical characteristic of the second portion responsive to displacement of the predetermined metallic vehicle component;
   deriving information regarding displacement of the predetermined metallic vehicle component based on the detected variation;
   detecting variation in a predetermined electrical characteristic of the first portion responsive to displacement of the predetermined metallic vehicle component; and
   optimizing responsiveness of the variation in the predetermined electrical characteristic of the second sensor portion at distances of the vehicle component from the sensor that are greater than distances at which the responsiveness to the variation in the predetermined electrical characteristic of the first portion is optimized.

12. The method of claim 11 wherein the responsiveness of the variation in the predetermined electrical characteristic of the second sensor portion is optimized by configuring the second sensor portion to have a higher impedance than the first sensor portion.

13. The method of claim 9 including arranging the first portion of the sensor to extend about the second portion of the sensor.

14. A method of detecting information relating to displacement of a vehicle component, the method comprising:
   energizing a first portion of an electronic sensor;
   generating a magnetic field in a predetermined metallic vehicle component;
   arranging a second portion of the electronic sensor in a predetermined spaced position relative to the first portion;
   detecting variation in a predetermined electrical characteristic of the second portion responsive to displacement of the predetermined metallic vehicle component;
   deriving information regarding displacement of the predetermined metallic vehicle component based on the detected variation; and
   arranging the first portion to extend in a generally annular configuration, and the second portion is arranged to extend in a generally annular configuration within the annular configuration of the first portion.

15. The method of claim 14 wherein the first and second portions are arranged concentric relative to each other.

* * * * *

UNITED STATES PATENT AND TRADEMARK OFFICE
CERTIFICATE OF CORRECTION

PATENT NO.        : 7,614,652 B2                                      Page 1 of 1
APPLICATION NO. : 11/460291
DATED             : November 10, 2009
INVENTOR(S)       : Aoki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 333 days.

Signed and Sealed this

Nineteenth Day of October, 2010

David J. Kappos
*Director of the United States Patent and Trademark Office*